Patented Jan. 12, 1954

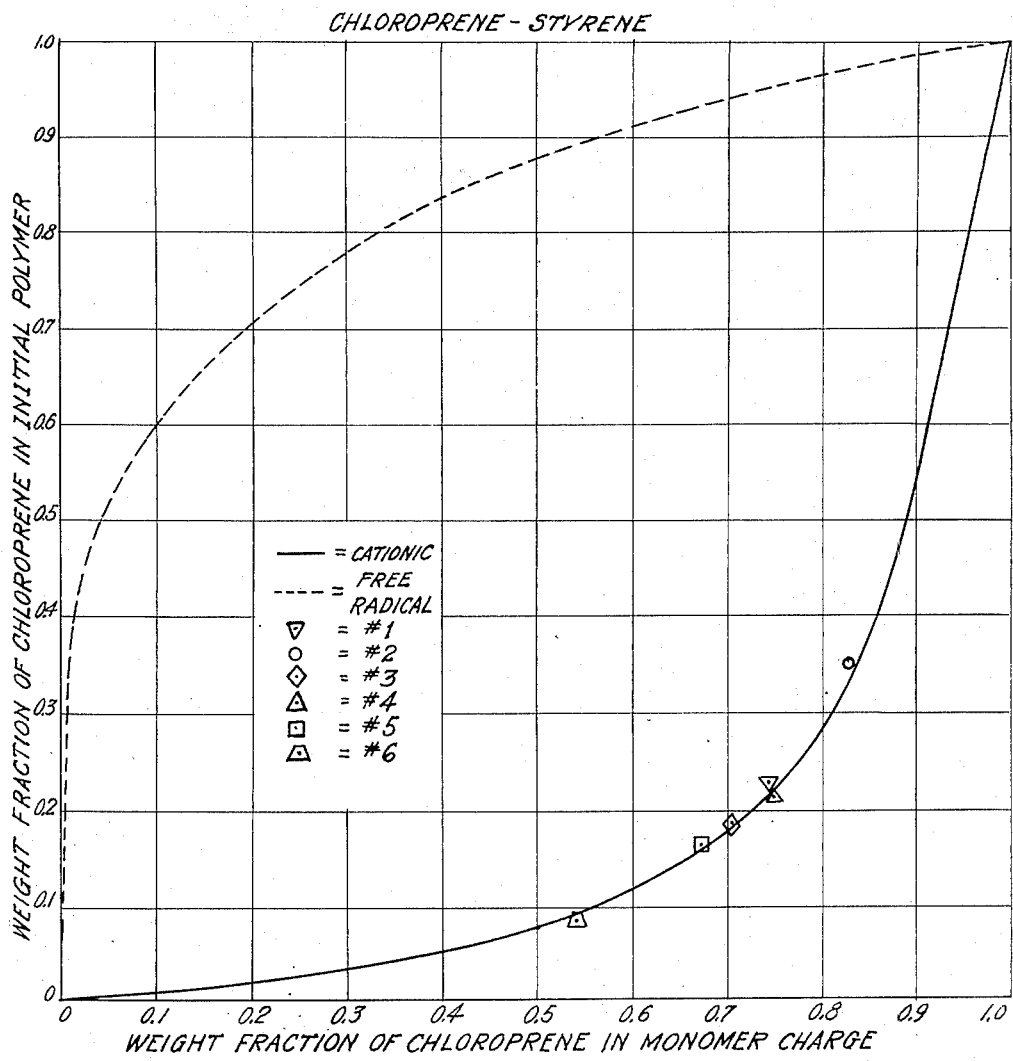

2,666,045

UNITED STATES PATENT OFFICE 2,666,045

COPOLYMERS OF STYRENE AND CHLOROPRENE PREPARED BY CATIONIC CATALYSIS

Frederick C. Foster, Canal Fulton, Ohio, assignor to The Firestone Tire & Rubber Company, Akron, Ohio, a corporation of Ohio Application August 19, 1949, Serial No. 111,226

1 Claim. (Cl. 260—87.5)

This invention relates to copolymers of styrene and chloroprene prepared by cationic catalysts. It includes the new copolymers and their preparation.

The copolymers are soluble in acetone, carbon tetrachloride, ethylene dichloride, chloroform, benzene, and the like. They may be used in coatings and hot-melts for impregnating paper, fabric, etc. to impart moisture resistance and stiffness.

There is a striking difference in the chloroprene-styrene system between the monomer reactivity ratios in a free-radical initiated copolymerization and in a cationically initiated copolymerization. In the free-radical initiated copolymerization, both types of growing free radicals (those with a terminal chloroprene group and those with a terminal styrene group) exhibit a strong preference to react with chloroprene monomer rather than styrene monomer. In the cationically initiated copolymerization, both types of growing chains prefer to react with styrene monomer rather than chloroprene monomer. High-styrene copolymer results. It has not heretofore been appreciated how much more reactive the styrene is than the chloroprene in such a system, and that products of an entirely different composition can be obtained by cationic catalysis.

Although boron fluoride is the catalyst used in carrying out the following experiments, other cationic catalysts will give comparable results, such as aluminum chloride, stannic chloride, ferric chloride, sulfuric acid, hydrofluoric acid, etc.

EXAMPLE 1

Six experiments were carried out using the amounts of reagents recorded in the first two columns of the following table. In each experiment 50 cc. of cyclohexane were added to a beverage bottle. Then the styrene and chloroprene were weighed into the bottle. The bottle was capped and rotated in a constant-temperature bath at —18° C. for at least one hour. The bottle was opened and 4 cc. of boron trifluoride-etherate were added. The bottle was recapped and again immersed in the bath maintained at —18° C. After about two hours the reaction was stopped by adding about 3 cc. of methanol. The copolymer was coagulated by pouring the reaction mixture into several times its volume of methanol and stirring. The copolymer was washed several times with methanol and dried. The yield of copolymer, the per cent monomers converted, and the chloroprene content of the several copolymers are given in the table. The chloroprene content was determined by chlorine analysis.

Table I

| Experiment | Styrene used, grams | Chloroprene used, grams | Yield of copolymer, grams | Percent conversion | Chloroprene content, percent |
|---|---|---|---|---|---|
| No. 1 | 18.05 | 35.47 | 14.30 | 26.7 | 21.7 |
| No. 2 | 12.75 | 54.68 | 3.33 | 4.9 | 34.9 |
| No. 3 | 20.71 | 44.33 | 5.50 | 8.5 | 18.1 |
| No. 4 | 22.96 | 64.94 | 2.75 | 3.1 | 20.8 |
| No. 5 | 20.30 | 39.09 | 3.60 | 6.1 | 15.9 |
| No. 6 | 35.48 | 35.86 | 11.31 | 15.9 | 8.4 |

The reactivity ratios are determined from the equations $$r_s = \frac{\log \frac{M_s^o}{M_s} - \frac{1}{p} \log \frac{1-p \quad M_c/M_s}{1-p \quad M_c^o/M_s^o}}{\log \frac{M_c^o}{M_c} + \log \frac{1-p \quad M_c/M_s}{1-p \quad M_c^o/M_s^o}} \quad \text{(Eq. 1)}$$

$$p = \frac{1-r_c}{1-r_s} \quad \text{(Eq. 2)}$$

where $M_s$ = moles of styrene in final monomer charge $M_s^o$ = moles of styrene in initial monomer charge $M_c$ = moles of chloroprene in final monomer charge $M_c^o$ = moles of chloroprene in initial monomer charge $p$ = a parameter The method of solution was as follows: Values of $M_s$, $M_s^o$, $M_c$ and $M_c^o$ calculated from the data of Experiment 1 were inserted into Equation 1. An arbitrary value of the parameter $p$ which was inserted into the substituted Equation 1, which was then solved for $r_s$. The resultant value of $r_s$ and the assumed value of $p$ were inserted into Equation 2, which was then solved for $r_c$. The values of $r_s$ and $r_c$ were then plotted as a first point on Cartesian coordinates. The above process was repeated, using a different assumed value of $p$, and the resultant values of $r_s$ and $r_c$ were again plotted as a second point on the Cartesian coordinates. A straight line was drawn through these two points.

The above process was repeated with values of $M_s$, $M_s^o$, $M_c$ and $M_c^o$ calculated from the data of each of the other Experiments 2–6, and the resultant straight lines were plotted on the same Cartesian coordinates as those on which the results from Experiment 1 were plotted. Theoretically, all of the straight lines should intersect exactly at a single point; however, due to experimental errors, the intersections were dispersed over a small area. A point was chosen by interpolation which appeared to represent the several intersections, the value of $r_c$ being 0.24 and the value of $r_s$ being 15.6 for this point. This was unexpected, being the reverse of the situation obtaining in the polymerization of these materials with a free-radical catalyst, where the values are 6.3 and .005 respectively. It is because of these different values that copolymers of unexpectedly high styrene content are produced in accordance with this invention.

The values $r_c=0.24$ and $r_s=15.6$ were inserted into the following monomer-polymer equation to give the monomer-polymer composition curve, which is the lower curve shown in the drawing:

$$\frac{dM_c}{dM_s}=\frac{M_c}{M_s}\frac{r_cM_c+M_s}{r_sM_s+M_c}=\frac{M_c}{M_s}\frac{0.24M_c+M_s}{15.6M_s+M_c}$$

(Eq. 3)

where $$\frac{dM_c}{dM_s}=$$

the mole ratio of chloroprene to styrene in the copolymer formed at any instant, and the other symbols are as defined above, with the provision that they refer to values at said instant, rather than final values.

A curve, which is the upper curve of the accompanying drawing, was plotted by using $r_c=6.3$ and $r_s=.005$, the values for the copolymerization of these materials with a free-radical catalyst. Likewise there are plotted on the graph a series of points 1, 2, 3, etc., the coordinates of which are averages of the initial and final monomer charge versus final copolymer composition, and it will be seen that these points closely approach the lower curve, as they should, since they were obtained from runs in which the conversions were quite low.

EXAMPLE 2

To obtain a copolymer of constant composition (90 per cent styrene and 10 per cent chloroprene) in a system such as the above, using 100 cc. cyclohexane, 8 cc. of boron trifluoride etherate and a constant temperature of about −18° C., starting with 55 grams of chloroprene and 45 grams of styrene, additional styrene is added in increments, the amount added at each interval depending upon the amount of chloroprene present. The amounts are given in Table II below.

The increments to be added are mathematically dependent upon the anomalous reactivity ratios of the monomers and upon the proportions of the monomers which have become polymerized, the calculations being as follows: As noted below (column 5, line 60) the composition of the polymer cannot be held precisely at 10% chloroprene, but rather is held between 9% and 11% chloroprene, with an average of 10%. Inserting values (on a molecular basis) corresponding to 9% and 11% in Equation 3 above, and solving, this will require that the ratios of unpolymerized chloroprene/unpolymerized styrene must be kept within the range of 55/45 (which yields copolymers containing 9% chloroprene) to 60/40 (which yields copolymers containing 11% chloroprene). The scheme thus will be to start the polymerization with an initial charge of 55 parts chloroprene and 45 parts styrene. As the polymerization proceeds, the proportion of unpolymerized chloroprene will rise due to the preferential polymerization of the styrene. The reaction mass is analyzed periodically, and before the chloroprene/styrene ratio has risen above 60/40, it is cut back by the addition of sufficient styrene to bring the ratio back to 55/45. The total cumulative amount of such increments necessary to bring the ratio back to 55/45 at any given time is dependent upon the amount of copolymer formed, as follows. Assuming that the copolymer formed contains an average of 10% chloroprene and 90% styrene, and employing the notation:

$C_o=55=$ the weight of chloroprene in the original charge $S_o=45=$ the weight of styrene in the original charge $P_t=$ the weight of copolymer formed up to a time $t$ immediately after addition of an increment of styrene $C_t=$ the weight of unpolymerized chloroprene remaining in the reaction mass at time $t$ $S_t=$ the weight of unpolymerized styrene remaining in the reaction mass at time $t$ $S_i=$ total cumulative weight of increments of styrene added after the reaction is under way up to time $t$ Then (4) $\qquad C_t=C_o-0.1P=55-0.1P$ and (5) $\qquad S_t=S_o+S_i-0.9P=45+S_i-0.9P$ from (4) and (5)

(6) $\qquad \dfrac{C_t}{S_t}=\dfrac{55-0.1P}{45+S_i-0.9P}$ but it is desired that (7) $\qquad \dfrac{C_t}{S_t}=\dfrac{55}{45}$ from (6) and (7)

(8) $\qquad \dfrac{55}{45}=\dfrac{55-0.1P}{45+S_i-0.9P}$ solving for $S_i$ (9) $\qquad S_i=.817P$ In accordance with Equation 9, whenever an incremental amount of styrene is to be added, the weight $P$ of copolymer formed up to that time is determined by analysis, and an increment of styrene is added in an amount such that the total cumulative weight of this increment plus all preceding increments (excluding the original charge of styrene) is equal to $S_i$ as calculated from $P$ per Equation 9.

Applying the foregoing calculations to the present example, the first column of Table II shows the weight $P$ of copolymer formed up to the times of the addition of successive increments of styrene. It will be noted that these increments are made at intervals such that not more than 10% of the unpolymerized material reacts between successive additions, so as to avoid the possibility of the ratio of unpolymerized chloroprene and unpolymerized styrene rising above 60/40. The weight $\Delta S_i$, second column of Table II, of each increment of styrene is adjusted so that, when added to the weight of all previous increments, the sum will be equal to the weight $S_i$ required by Equation 9 and tabulated in the third column of Table II. Thus, considering the tenth row of Table II, the weight P of copolymer formed is determined by analysis to be 93.70 grams. Inserting this into Equation 9, $$S_i = 93.70 \times 0.817 = 76.59$$

as set out in Table II column 3. The increment of styrene to be added is the difference between 76.59 and the preceding value of $S_i$, i. e., 76.59−69.44=7.15 which is the $\Delta S_i$ tabulated in column 2 of Table II. It will be seen that, operating in this manner, the ratio of unpolymerized chloroprene/unpolymerized styrene will always be kept within the limits 55/45 and 60/40, which is required if the chloroprene content of the copolymer formed is to be kept between 9% and 11%.

Table II

| Total grams of copolymer produced P | Grams of styrene added $\Delta S_i$ | Cumulative grams of styrene added $S_i$ |
|---|---|---|
| 10.00 | 8.17 | 8.17 |
| 19.86 | 8.06 | 16.23 |
| 29.58 | 7.94 | 24.17 |
| 39.16 | 7.83 | 32.00 |
| 48.60 | 7.72 | 39.72 |
| 57.90 | 7.60 | 47.32 |
| 67.06 | 7.49 | 54.81 |
| 76.08 | 7.37 | 62.18 |
| 84.96 | 7.26 | 69.44 |
| 93.70 | 7.15 | 76.59 |
| 102.30 | 7.03 | 83.62 |
| 110.76 | 6.92 | 90.54 |
| 119.08 | 6.80 | 97.34 |
| 127.26 | 6.69 | 104.03 |
| 135.30 | 6.58 | 110.61 |
| 143.20 | 6.46 | 117.07 |
| 150.96 | 6.35 | 123.42 |
| 158.58 | 6.23 | 129.65 |
| 166.06 | 6.12 | 135.77 |
| 173.40 | 6.01 | 141.78 |
| 180.60 | 5.89 | 147.67 |
| 187.66 | 5.78 | 153.45 |
| 194.58 | 5.66 | 159.11 |
| 201.36 | 5.55 | 164.66 |
| 208.00 | 5.44 | 170.10 |
| 214.50 | 5.32 | 175.42 |
| 220.86 | 5.21 | 180.63 |
| 227.08 | 5.09 | 185.72 |
| 233.16 | 4.98 | 190.70 |
| 239.10 | 4.87 | 195.57 |
| 244.90 | 4.75 | 200.32 |
| 250.56 | 4.64 | 204.96 |
| 256.08 | 4.52 | 209.48 |
| 261.46 | 4.41 | 213.89 |
| 266.70 | 4.30 | 218.19 |
| 271.80 | Stop | 218.19 |

The above copolymerization is carried to 85.4 per cent conversion, based on the total weight of monomers used (initial charge plus all additions). The composition of the copolymer is closely held between 9 and 11 per cent of chloroprene, with an average of 10 per cent.

EXAMPLE 3

The following example shows that the reaction can be carried out at higher temperatures. The charge was as follows:

| | |
|---|---|
| Chloroprene | grams__ 18 |
| Styrene | do____ 20 |
| Cyclohexane | do____ 39 |
| Boron trifluoride etherate | ml__ 3 |

The chloroprene, styrene and cyclohexane were mixed together and charged into a bottle, and the boron trifluoride etherate was then added and mixed in. An exothermic reaction began in about one and one-half minutes, and cooling was applied to the bottle so that the temperature did not exceed about 70 to 80° C. When the reaction subsided, the mass was permitted to stand for two hours, after which it was poured into methanol. A white solid copolymer was precipitated, separated by filtration, washed on the filter with methanol, and dried. The product weighed 21.42 grams, a yield of 56.5 per cent. The intrinsic viscosity, determined at 25° C. in acetone was 0.048, and the chloroprene content, as determined by chlorine analysis, was 15.5 per cent.

Although the reactions described above were carried out using cyclohexane as a solvent, it will be understood that similar reactions may be carried out in other non-polar solvents, such as benzene, hexane, toluene, the xylenes, petroleum ether, etc. The temperature does not seem to affect the reaction greatly, and may range from −50° C. to 80° C., and even a broader range may be employed. Although the etherate of boron trifluoride is used in the examples, it is understood that the boron trifluoride is the effective catalyst and the etherate is employed only because of its greater stability.

What I claim is:

A process for producing a polymer composed of 10% chloroprene and 90% styrene, which comprises copolymerizing styrene and chloroprene with a cationic catalyst, employing 55 parts by weight of chloroprene and 45 parts by weight of styrene in the initial charge, and adding increments of styrene to the charge during the polymerization in amounts such that the total cumulative weight $S_i$ of the styrene added up to any given time is related to the weight P of the polymer formed, substantially in accordance with Table II.

FREDERICK C. FOSTER.

References Cited in the file of this patent

UNITED STATES PATENTS

| Number | Name | Date |
|---|---|---|
| 2,138,895 | Wiezevich | Dec. 6, 1938 |
| 2,151,382 | Harmon | Mar. 21, 1939 |
| 2,397,146 | Kellog et al | Mar. 26, 1946 |
| 2,420,330 | Shriver et al. | May 13, 1947 |
| 2,496,384 | De Nie | Feb. 7, 1950 |
| 2,563,997 | Elwell et al. | Aug. 14, 1951 |

FOREIGN PATENTS

| Number | Country | Date |
|---|---|---|
| 106,371 | Australia | Jan. 26, 1939 |
| 848,411 | France | Oct. 30, 1939 |